US009677654B2

(12) United States Patent
Jewell

(10) Patent No.: US 9,677,654 B2
(45) Date of Patent: Jun. 13, 2017

(54) TORQUE CONVERTER WITH A SELECTIVE PRESSURE ACTIVATED SEAL SYSTEM

(71) Applicant: Schaeffler Technologies AG & Co. KG, Herzogenaurach (DE)

(72) Inventor: Jeremy Jewell, Wooster, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 14/807,964

(22) Filed: Jul. 24, 2015

(65) Prior Publication Data

US 2017/0023116 A1 Jan. 26, 2017

(51) Int. Cl.
*F16H 45/02* (2006.01)

(52) U.S. Cl.
CPC ....... *F16H 45/02* (2013.01); *F16H 2045/021* (2013.01); *F16H 2045/0215* (2013.01); *F16H 2045/0221* (2013.01); *F16H 2045/0294* (2013.01)

(58) Field of Classification Search
CPC ............... F16H 45/02; F16H 2045/021; F16H 2045/0215; F16H 2045/0221; F16H 2045/0294
See application file for complete search history.

(56) References Cited

U.S. PATENT DOCUMENTS

| | | | | |
|---|---|---|---|---|
| 5,699,887 A * | 12/1997 | Kundermann | .......... | F16H 45/02 192/3.26 |
| 8,348,036 B2 | 1/2013 | Ari et al. | | |
| 2014/0262666 A1* | 9/2014 | Ushio | ...................... | F16H 45/02 192/3.29 |
| 2015/0008086 A1* | 1/2015 | Mototsune | .............. | F16H 45/02 192/3.29 |
| 2015/0300473 A1* | 10/2015 | Smith | ..................... | F16H 41/28 60/330 |
| 2016/0017971 A1* | 1/2016 | Sayre | ..................... | F16H 45/02 192/3.29 |

* cited by examiner

*Primary Examiner* — Richard Lorence
(74) *Attorney, Agent, or Firm* — Paul Chester Maliszeski

(57) ABSTRACT

A torque converter including: a cover arranged to receive torque from an engine; an impeller; a turbine; an output hub arranged to non-rotatably connect to an input shaft for a transmission; a lockup clutch including an axially displaceable piston plate and arranged to directly connect the cover to the output hub; and a seal system including a pilot portion including first and second channels and a secondary hub non-rotatably connected to the output hub and axially displaceable with respect to the output hub to control flow of pressurized fluid through the first and second channels, or non-rotatably connected to the pilot portion and axially displaceable with respect to the pilot portion to control flow of pressurized fluid through the first and second channels.

20 Claims, 11 Drawing Sheets

TORQUE CONVERTER WITH A SELECTIVE PRESSURE ACTIVATED SEAL SYSTEM

TECHNICAL FIELD

The present disclosure relates generally to a torque converter with a selective pressure activated seal system, in particular, a seal system displaced by fluid pressures in a four-pass torque converter during torque converter and lockup modes for the torque converter to assist in lift-off for a piston in a lockup clutch in a release mode for the clutch.

BACKGROUND

Known four pass torque converter designs include four fluid circuits: two circuits to charge the torus; one circuit to apply the lock up clutch; and one circuit connected to the sump (atmospheric pressure). These designs also use leaf springs to control the lift-off of the piston and insure clutch clearance during clutch release mode operation. Seals used to isolate the various pressure chambers of the clutch system introduce a drag force, acting against the lift-off of the pitons, that can be greater than the force generated by the leaf springs. This drag can prevent the piston from lifting off the clutch to the desired clearance, or in a worst case scenario cause the piston to remain in contact with the clutch plate. Both cases generate undesirable drag in the system and impact torque converter performance.

SUMMARY

The present disclosure broadly comprises a torque converter, including: a cover arranged to receive torque from an engine; an impeller; a turbine; an output hub arranged to non-rotatably connect to an input shaft for a transmission; a lockup clutch including an axially displaceable piston plate and arranged to directly connect the cover to the output hub; and a seal system including a pilot portion including first and second channels and a secondary hub non-rotatably connected to the output hub and axially displaceable with respect to the output hub to control flow of pressurized fluid through the first and second channels, or non-rotatably connected to the pilot portion and axially displaceable with respect to the pilot portion to control flow of pressurized fluid through the first and second channels.

The present disclosure broadly comprises a torque converter, including: a cover arranged to receive torque from an engine; an impeller; a turbine; an output hub arranged to non-rotatably connect to an input shaft for a transmission; a lockup clutch including an axially displaceable piston plate arranged to directly connect the cover to the output hub; a release pressure chamber partially bounded by the piston; an apply pressure chamber partially bounded by the piston; and a seal system including a pilot portion including first and second channels and a secondary hub non-rotatably connected to the output hub and axially displaceable with respect to the output hub to control flow of pressurized fluid through the first and second channels. For a torque converter mode, fluid pressure in the release pressure chamber is arranged to displace the piston in a first axial direction to open the lockup clutch and enable independent rotation of the output hub with respect to the cover. For a lockup mode, fluid pressure in the apply pressure chamber is arranged to displace the piston in a second axial direction, opposite the first axial direction, to close the lockup clutch and non-rotatably connect the cover and the output hub. The first and second channels open to the release pressure chamber and the apply pressure chamber, respectively.

The present disclosure broadly comprises a torque converter, including: a cover arranged to receive torque from an engine; an impeller; a turbine; an output hub arranged to non-rotatably connect to an input shaft for a transmission; a lockup clutch including an axially displaceable piston plate arranged to directly connect the cover to the output hub; a release pressure chamber partially bounded by the piston; an apply pressure chamber partially bounded by the piston; and a seal system including a pilot portion including first and second channels and a secondary hub non-rotatably connected to the pilot portion and axially displaceable with respect to the pilot portion to control flow of pressurized fluid through the first and second channels. For a torque converter mode, fluid pressure in the release pressure chamber is arranged to displace the piston in a first axial direction to open the lockup clutch and enable independent rotation of the output hub with respect to the cover. For a lockup mode, fluid pressure in the apply pressure chamber is arranged to displace the piston in a second axial direction, opposite the first axial direction, to close the lockup clutch and non-rotatably connect the cover and the output hub. The first and second channels open to the release pressure chamber and the apply pressure chamber, respectively.

BRIEF DESCRIPTION OF THE DRAWINGS

The nature and mode of operation of the present disclosure will now be more fully described in the following detailed description of the present disclosure taken with the accompanying figures, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Unless defined otherwise, all technical and scientific terms used herein have the same meaning as commonly understood to one of ordinary skill in the art to which this present disclosure belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

Figure 1:
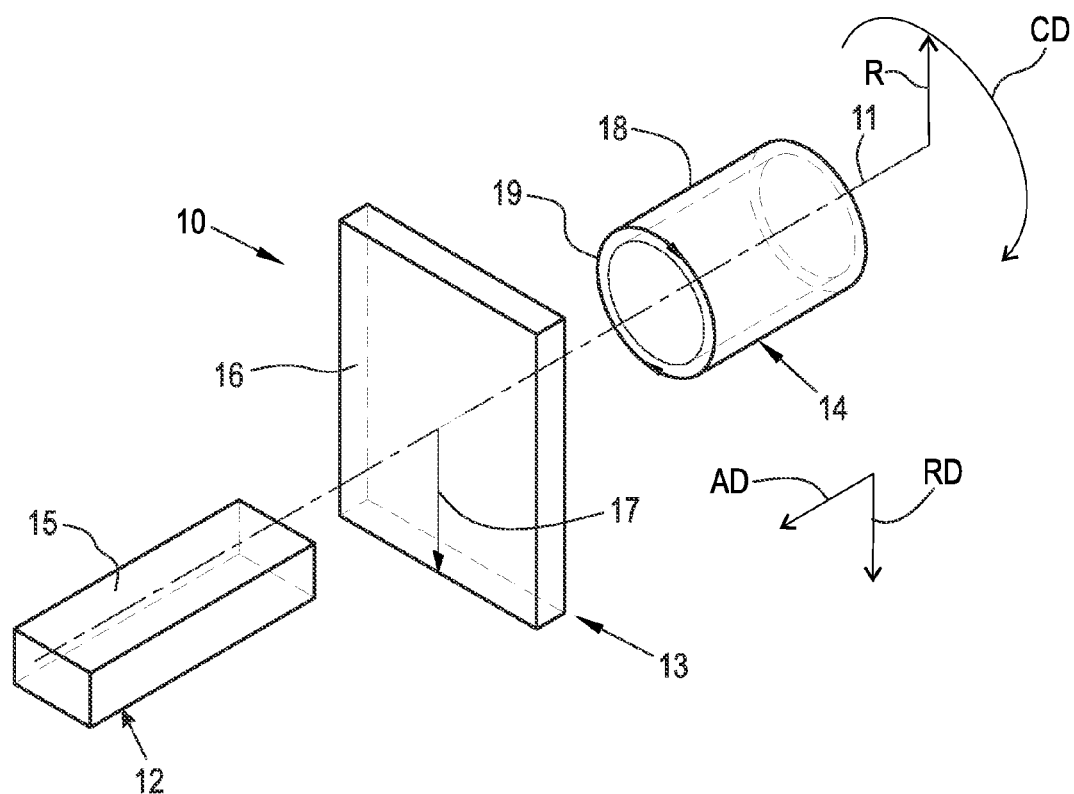
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
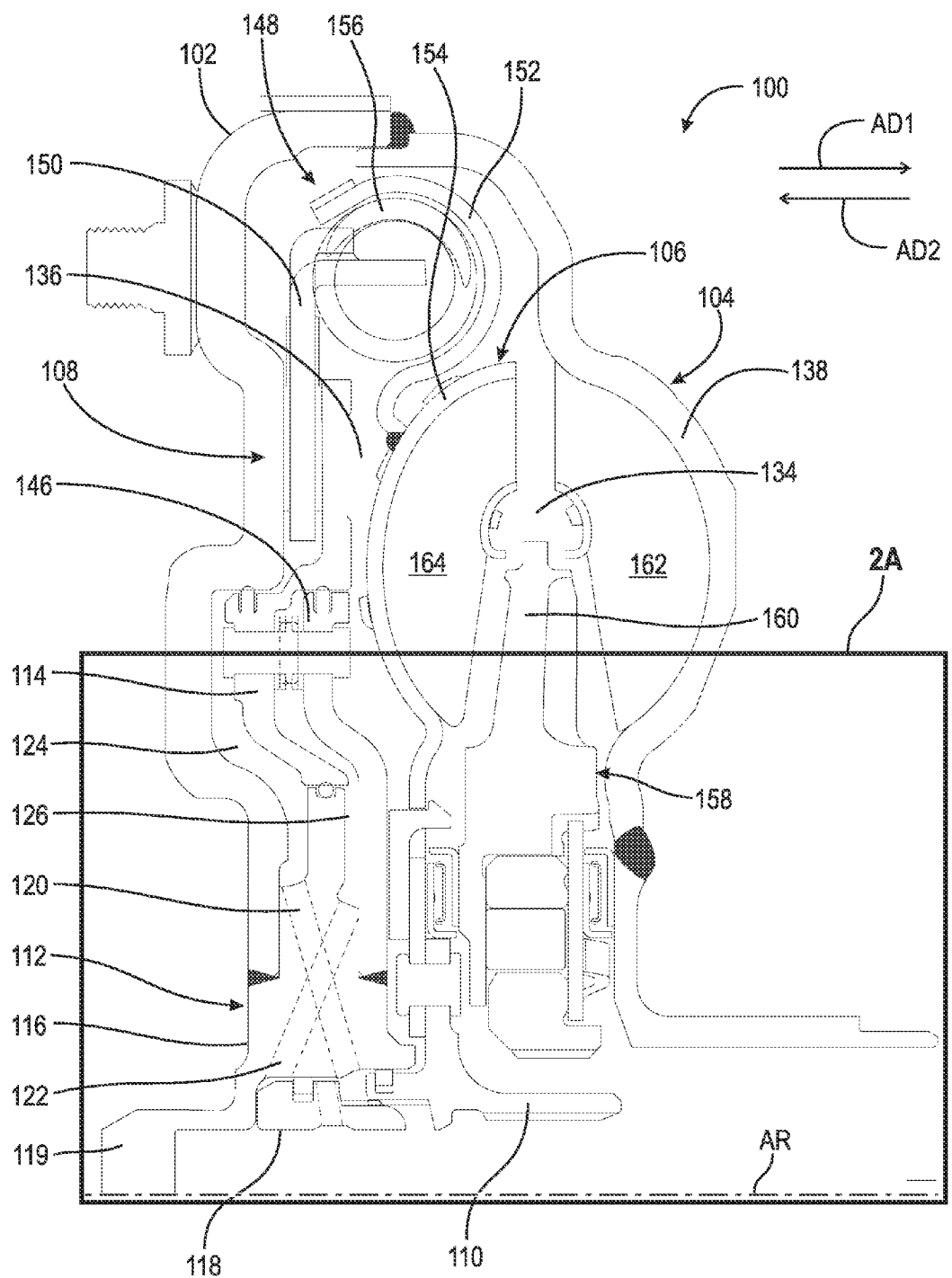
FIG. 2 is a cross-section view of a torque converter with a selective pressure activated seal system in a torque converter mode.

FIG. 2 is a cross-section view of torque converter 100 with a selective pressure activated seal system in a torque converter mode.

Figure 2A:
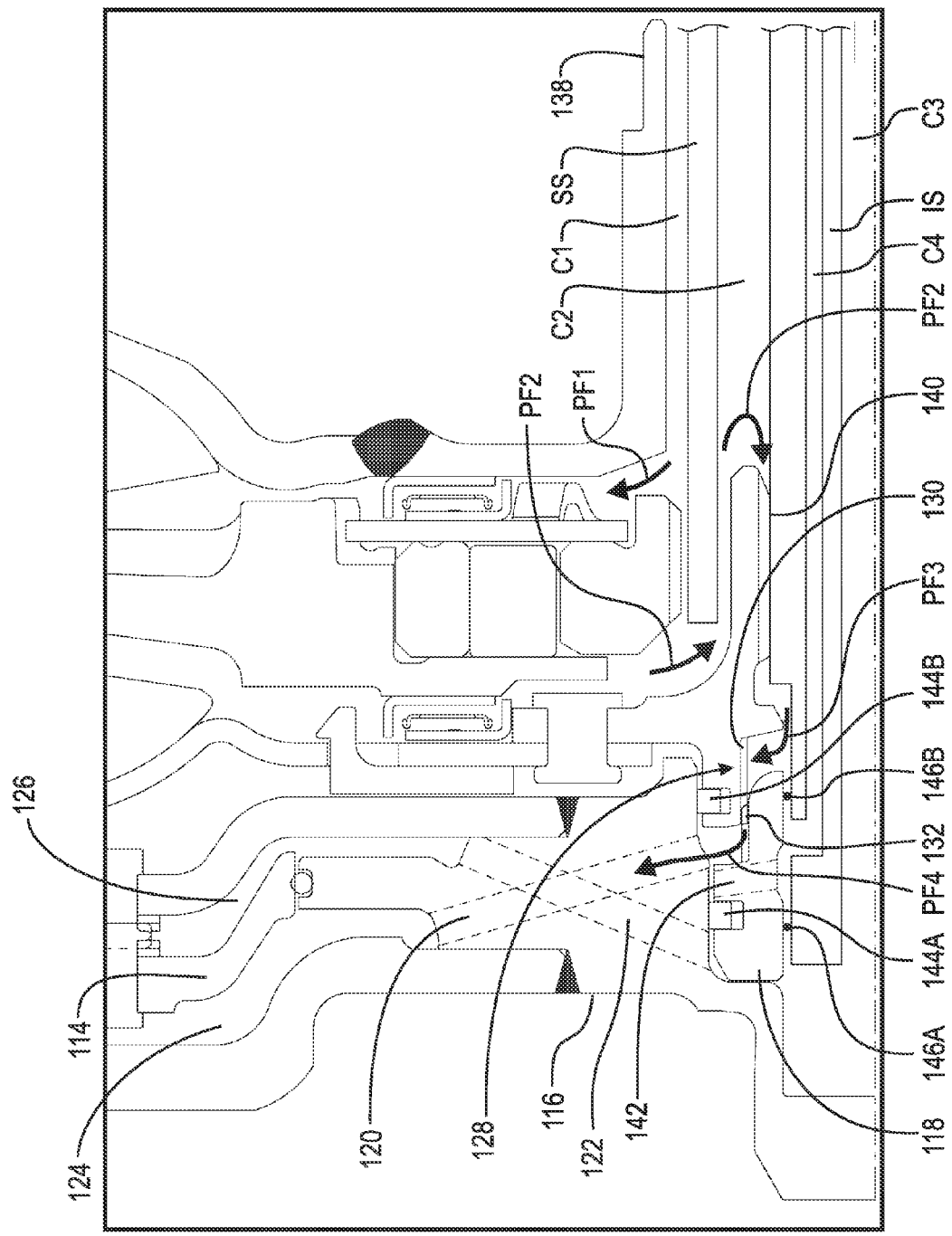
FIG. 2A is a detail of area 2A in FIG. 2.

FIG. 2A is a detail of area 2A in FIG. 2. The following should be viewed in light of FIGS. 2 and 2A. Torque converter includes axis of rotation AR, cover 102, impeller 104, turbine 106, lockup clutch 108, output hub 110, and pressure activated seal system 112. The cover is arranged to receive torque from an engine (not shown). Output hub 110 arranged to non-rotatably connect to input shaft IS for a transmission (schematically represented in FIG. 2A). The lockup clutch includes axially displaceable piston plate 114 and, as is known in the art, is arranged to directly connect cover 102 to output hub 110. Seal system 112 includes pilot portion 116 and secondary hub 118. In an example embodiment, portion 116 is part of pilot 119 non-rotatably connected to cover 102. Portion 116 includes channels 120 and 122. Hub 118 is non-rotatably connected to output hub 110 and axially displaceable (in opposite axial directions AD1 and AD2) with respect to output hub 110 to control flow of pressurized fluid through channels 120 and 122. By "non-rotatably connected" we mean that whenever hub 110 rotates, hub 118 rotates, and whenever hub 118 rotates, hub 110 rotates. Axial or radial displacement between non-rotatably connected components is possible according to the particular configuration involved.

Figure 3:
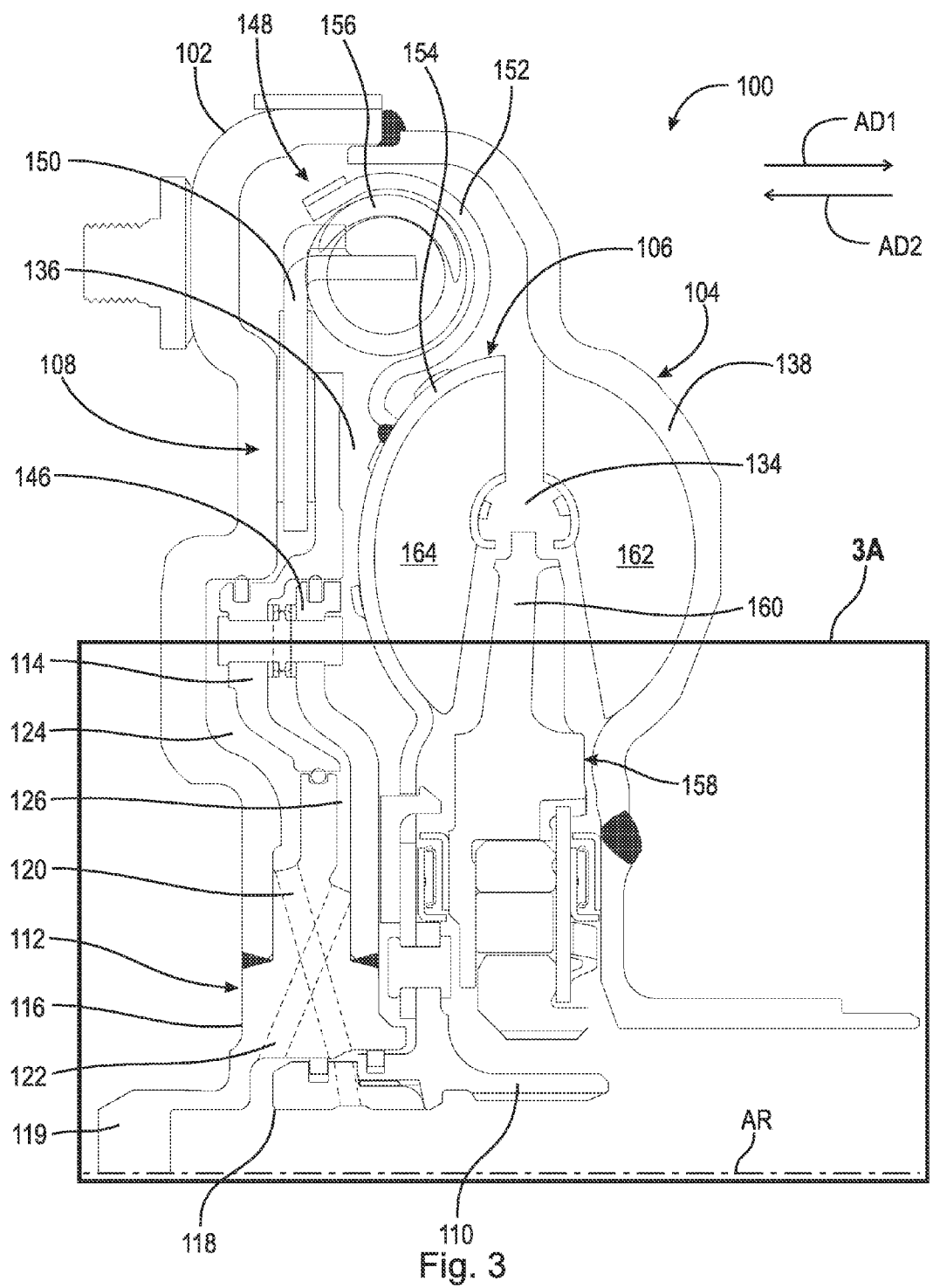
FIG. 3 is a cross-section view of the torque converter of FIG. 2 in a lockup mode.

FIG. 3 is a cross-section view of torque converter 100 with a selective pressure activated seal system in a lockup mode.

Figure 3A:
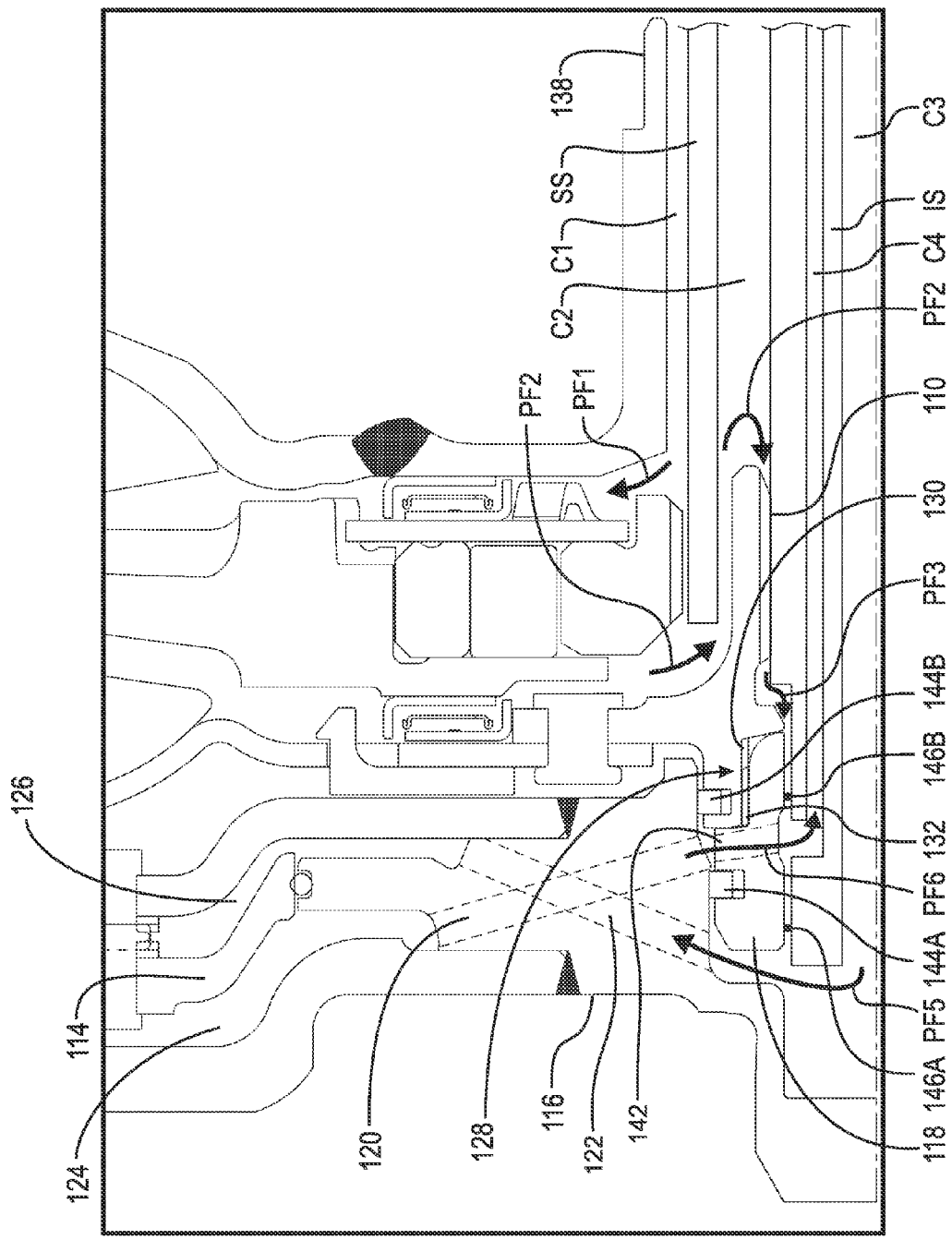
FIG. 3A is a detail of area 3A in FIG. 3.

FIG. 3A is a detail of area 3A in FIG. 3. The following should be viewed in light of FIGS. 2 through 3A. Torque converter 100 includes release pressure chamber 124 and apply pressure chamber 126, each of which are partially bounded by piston 114. For a torque converter mode, fluid pressure in release pressure chamber 124 is arranged to displace piston 114 in a axial direction AD1 to open the lockup clutch and enable independent rotation of output hub 110 with respect to cover 102. For a lockup mode, fluid pressure in apply pressure chamber 126 is arranged to displace piston 114 in axial direction AD2 to close the lockup clutch and non-rotatably connect cover 102 and output hub 110. Channels 120 and 122 open to release pressure chamber 124 and apply pressure chamber 126, respectively.

Hubs 110 and 118 are non-rotatably connected by non-rotatable connection 128 including respective portions of output hub 110 and secondary hub 118, for example, teeth, or splines, 130 and 132, respectively, interleaved in a circumferential direction as is known in the art. For the torque converter mode, fluid pressure in torque converter 100, for example in torus 134 or chamber 136, is arranged to displace secondary hub axial direction AD2 such that secondary hub 118 blocks fluid flow through channel 122, and fluid flows through non-rotatable connection 128 and channel 120 to release pressure chamber 124.

For example, torus 134 and pressure chamber 136 are axially located between cover 102 and impeller shell 138 and are not included as part of the apply pressure chamber or the release pressure chamber. Pressurized fluid PF1 is arranged to flow from channel C1 (formed by stator shaft SS and pump hub 138) into torque converter 100 and pressurized fluid PF2 is arranged to flow out of the torque converter to channel C2 (formed by shaft SS and shaft IS). For the torque converter mode, fluid pressure in torus 134 and chamber 136, via channel C2, is arranged to displace secondary hub 118 in axial direction AD2. For example, pressurized fluid PF3 flows past splines 140 on hub 110 (non-rotatably connecting hub 110 to shaft IS), and pressurized fluid PF4 flows through connection 128. Since torque converter 100 is in the torque converter mode, fluid pressure in channel C3 in shaft IS (which urges hub 118 in direction AD1) is lower than fluid pressure in channel C2, fluid PF3 displace hub 118 in direction AD2 until hub 118 contacts portion 116, blocking flow from channel C3 to channel 122. It should be noted that fluid PF2, PF3, and PF4 are the same fluid stream, but are individually labeled to clarify the presentation.

In the example embodiment of FIGS. 2 and 3, hub 118 includes channel 142. For the lockup mode, fluid pressure in torque converter 100 displaces secondary hub 118 in axial direction AD1 such that pressurized fluid PF5 flows past the secondary hub into apply pressure chamber 126 via channel 122, and pressurized fluid PF6 flows out of release apply chamber 124 through channel 120 to channel C4 in shaft IS. Channel C4 is connected to a sump and is typically at atmospheric pressure. In lockup mode, fluid PF5 is at a higher pressure than fluid PF3, causing fluid PF5 to displace hub 118 in direction AD1.

In the example embodiment of FIGS. 2 and 3: assembly 112 includes dynamic seals 144A and 144B sealing hub 118 with respect to portion 116 and enabling relative rotation between hub 118 and portion 116; and, O-rings 146A and 146B arranged to seal hub 118 against shaft IS and separate channels C3 and C4 and separate channels C3 and 142 from fluid PF3.

In the example embodiment of FIGS. 2 and 3, torque converter 100 includes: plate 146 non-rotatably connected to portion 116 and bounding chamber 126; and torsional vibration damper 148 including input part 150, output part 152 non-rotatably connected to turbine shell 154, and at least one spring 156 engaged with parts 152 and 154. In the lockup mode, piston 114 clamps part 150 to cover 102 to transmit torque from cover 102 to shell 154 via springs 156 and part 152. Shell 154 is non-rotatably connected to hub 110.

In the example embodiment of FIGS. 2 and 3: torque converter 100 includes stator 158 with at least one stator blade 160; impeller 104 includes at least one impeller blade 162 connected to shell 138; and turbine 106 includes at least one turbine blade 164 connected to shell 154.

Figure 4:
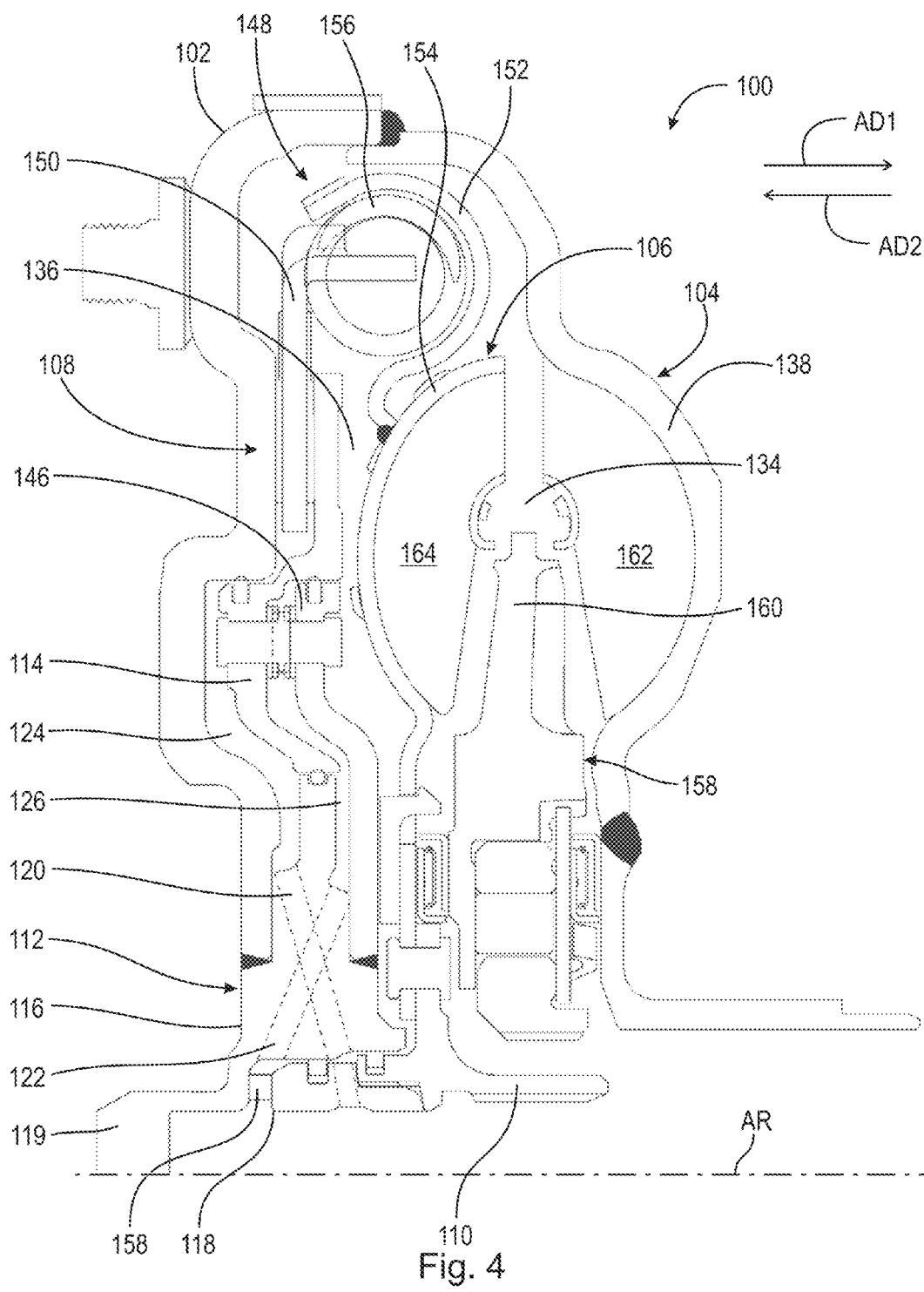
FIG. 4 is a cross-section view of the torque converter of FIG. 2 with a resilient element in the selective pressure activated seal system.

FIG. 4 is a cross-section view of torque converter 100 of FIG. 2 with resilient element 158 in selective pressure activated seal system 112. In an example embodiment, resilient element 158, for example, a wave washer, is axially disposed between portion 116 and hub 118. Element 158 reacts against portion 116 to urge hub 118 in direction AD1. The force applied by element 158 helps to overcome pressure applied to hub 118 in direction AD2 by fluid PF3.

Figure 5:
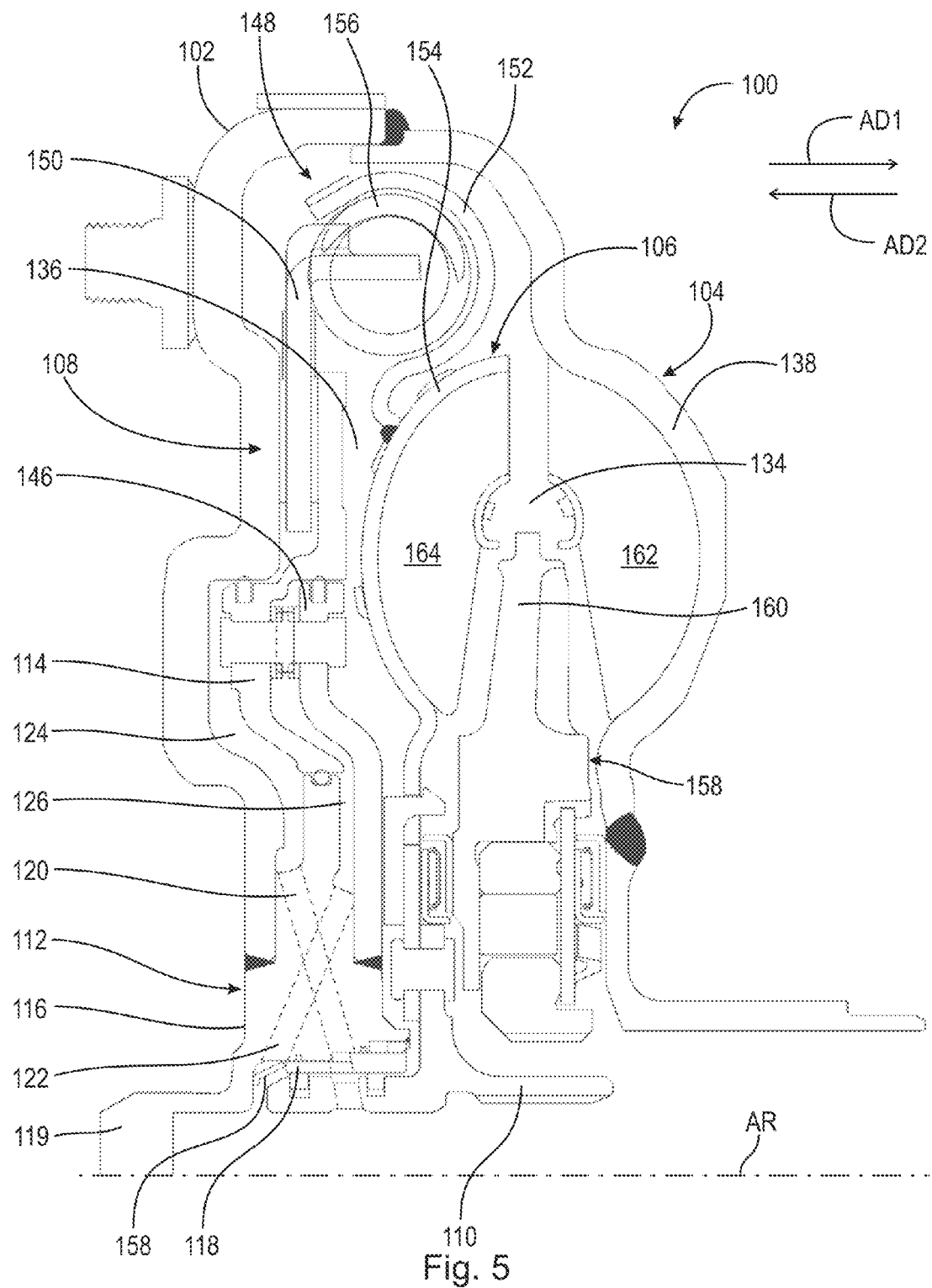
FIG. 5 is a cross-section view of a torque converter with a resilient element in a selective pressure activated seal system.

FIG. 5 is a cross-section view of torque converter 100 with resilient element 158 in selective pressure activated seal system 112. In an example embodiment, resilient element 158, for example, a diaphragm spring, is axially disposed between portion 116 and hub 118. Element 158 reacts against portion 116 to urge hub 118 in direction AD1. The force applied by element 158 helps to overcome pressure applied to hub 118 in direction AD2 by fluid PF3.

Figure 6:
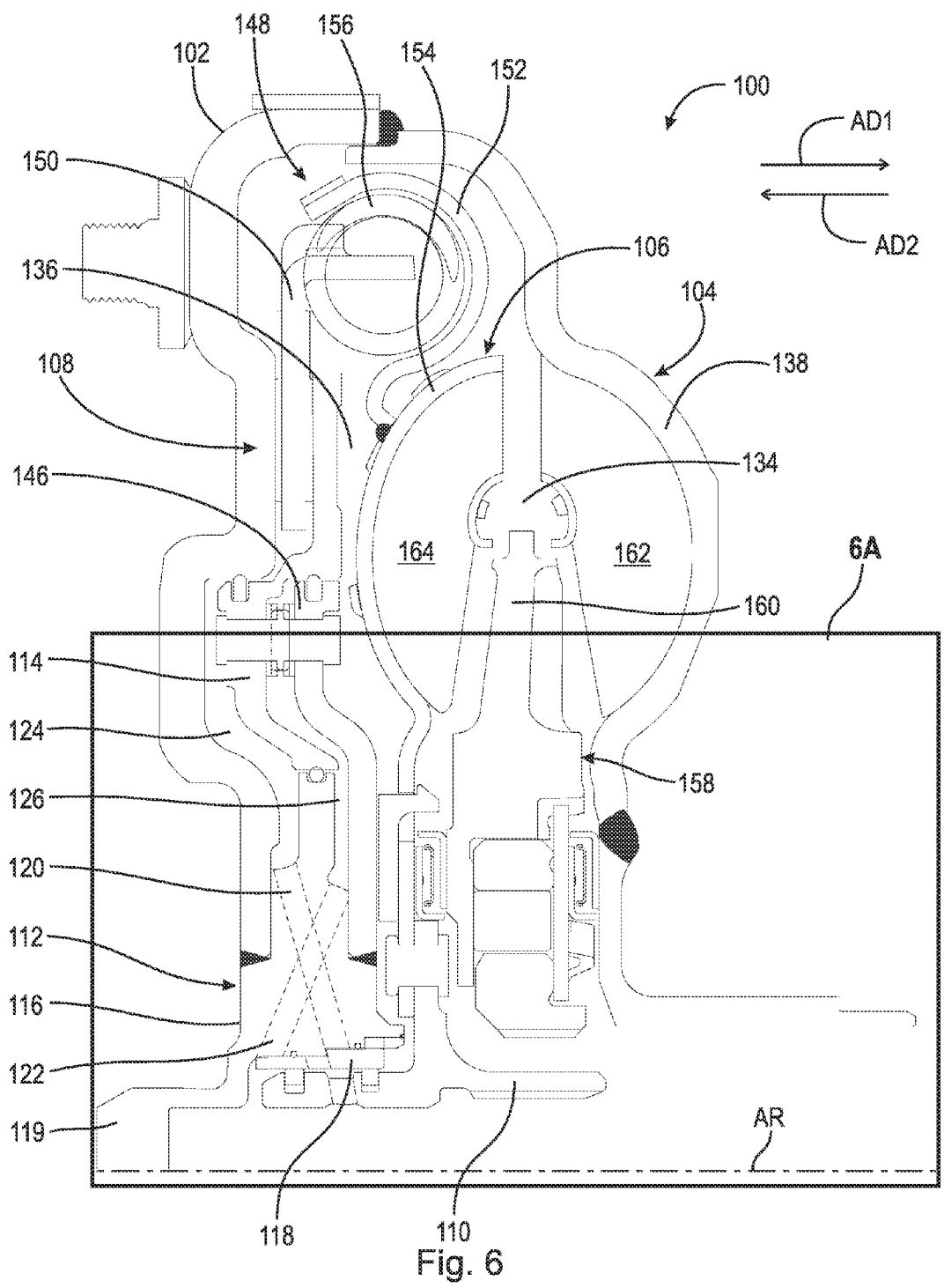
FIG. 6 is a cross-section view of a torque converter with a selective pressure activated seal system in a torque converter mode.

FIG. 6 is a cross-section view of torque converter 100 with a selective pressure activated seal system in a torque converter mode.

Figure 6A:
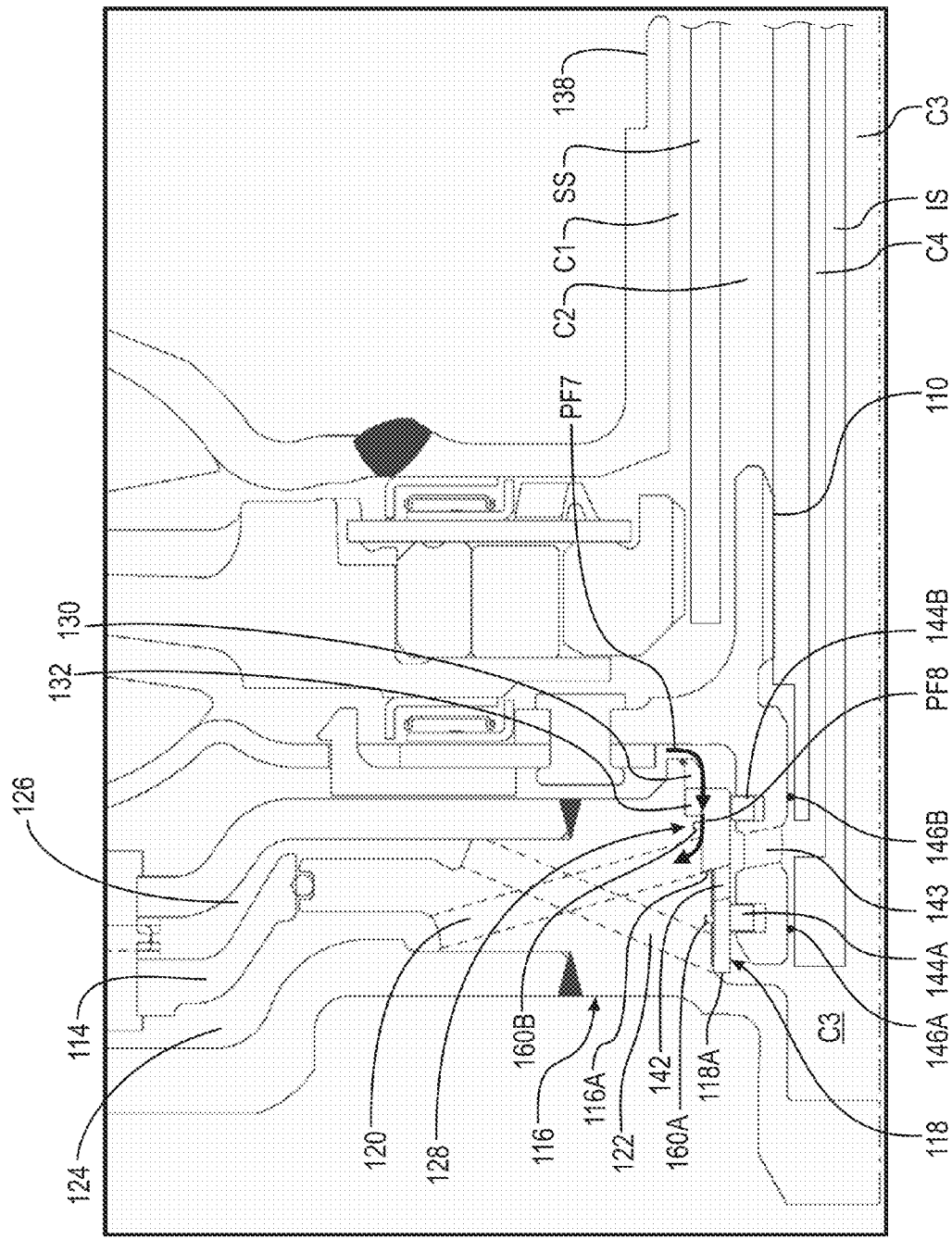
FIG. 6A is a detail of area 6A in FIG. 6.

FIG. 6A is a detail of area 6A in FIG. 6. The following should be viewed in light of FIGS. 6 and 6A. Torque converter includes axis of rotation AR, cover 102, impeller 104, turbine 106, lockup clutch 108, output hub 110, and pressure activated seal system 112. The cover is arranged to receive torque from an engine (not shown). Output hub 110 arranged to non-rotatably connect to input shaft IS for a transmission (schematically represented in FIG. 6A). The lockup clutch includes axially displaceable piston plate 114 and, as is known in the art, is arranged to directly connect cover 102 to output hub 110. Seal system 112 includes pilot portion 116 and secondary hub 118. In an example embodiment, portion 116 is part of pilot 119 non-rotatably connected to cover 102. Portion 116 includes channels 120 and 122. Hub 118 is non-rotatably connected to portion 116 and axially displaceable (in opposite axial directions AD1 and AD2) with respect to the portion 116 to control flow of pressurized fluid through channels 120 and 122. In an example embodiment: O-ring 160A forms a seal between portion 116 and hub 118; and O-ring 160B forms a partial seal between portion 116 and 118 as further described below.

Figure 7:
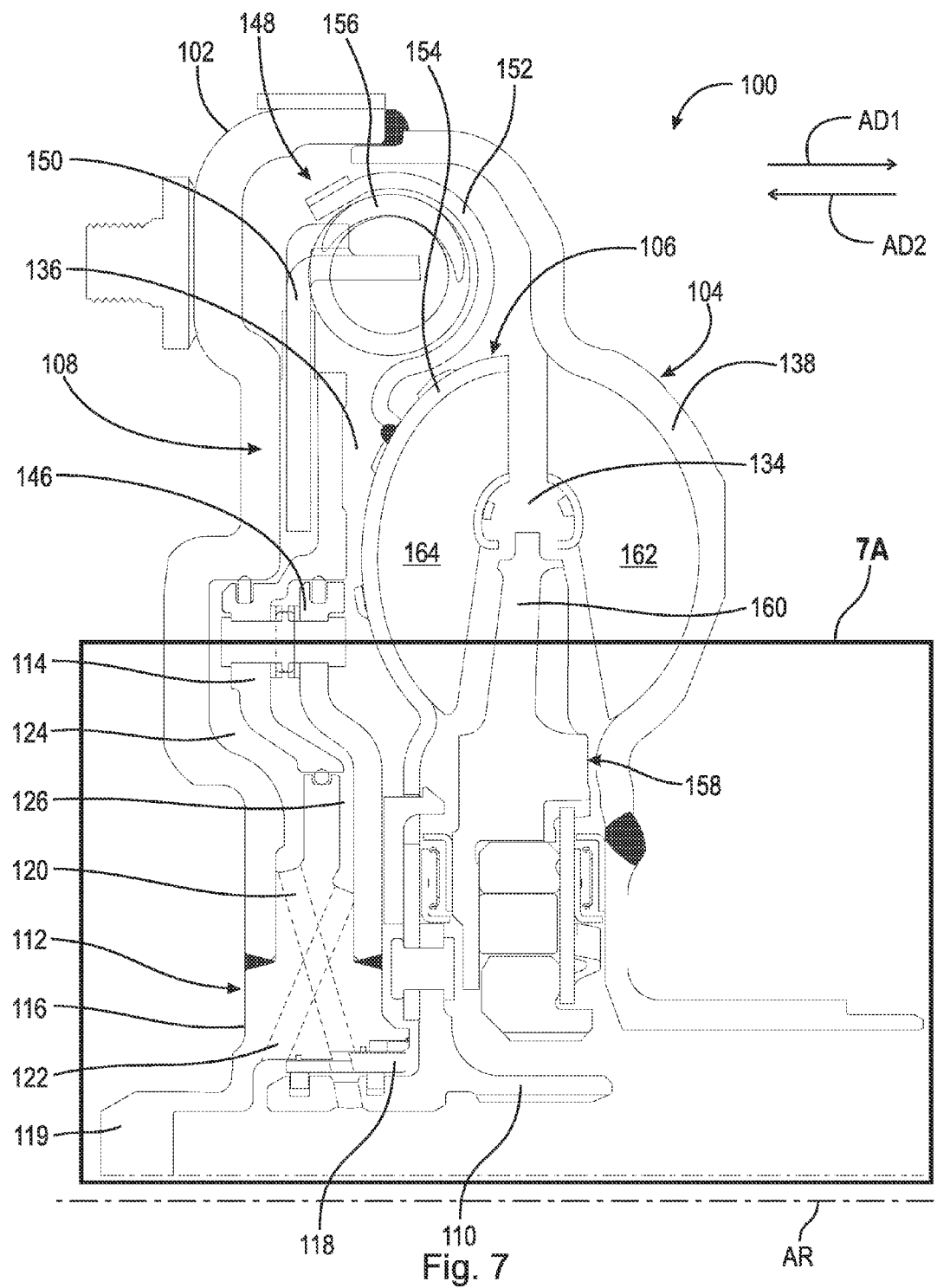
FIG. 7 is a cross-section view of the torque converter of FIG. 6 in a lockup mode; and, FIG. 7A is a detail of area 7A in FIG. 7.

FIG. 7 is a cross-section view of torque converter 100 of FIG. 6 in a lockup mode.

Figure 7A:
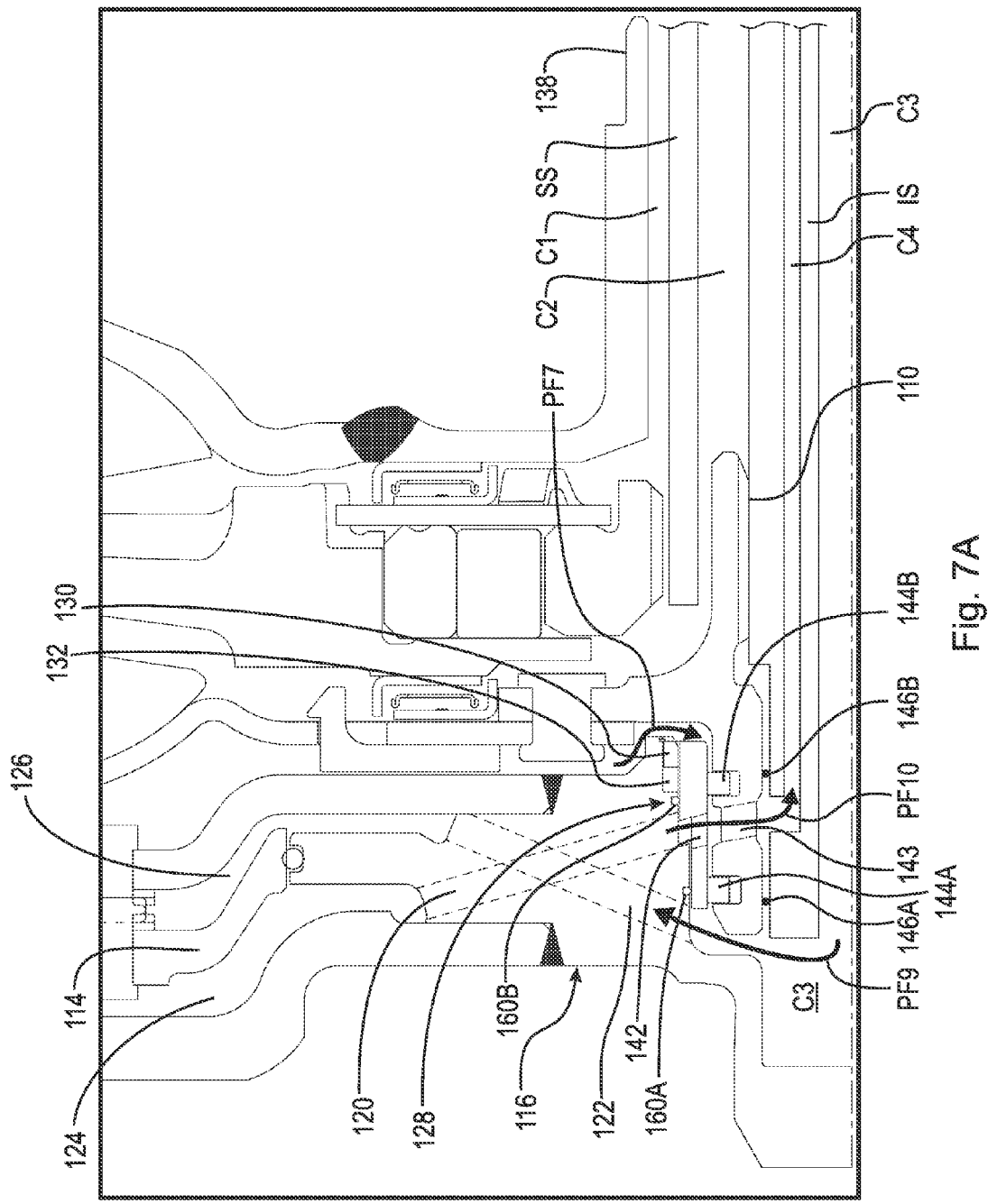

FIG. 7A is a detail of area 7A in FIG. 7. The following should be viewed in light of FIGS. 6 through 7A. Torque converter 100 includes release pressure chamber 124 and apply pressure chamber 126, each of which are partially bounded by piston 114. For a torque converter mode, fluid pressure in release pressure chamber 124 is arranged to displace piston 114 in a axial direction AD1 to open the lockup clutch and enable independent rotation of output hub 110 with respect to cover 102. For a lockup mode, fluid pressure in apply pressure chamber 126 is arranged to displace piston 114 in axial direction AD2 to close the lockup clutch and non-rotatably connect cover 102 and output hub 110. Channels 120 and 122 open to release pressure chamber 124 and apply pressure chamber 126, respectively.

Portion 116 and hub 118 are non-rotatably connected by non-rotatable connection 128 including respective portions of portion 116 and secondary hub 118, for example, teeth, or splines, 130 and 132, respectively, interleaved in a circumferential direction as is known in the art. For the torque converter mode, fluid pressure torque converter 100, for example in torus 134 or chamber 136, is arranged to displace secondary hub 118 axial direction AD2 such that secondary hub 118 blocks fluid flow through channel 122, and fluid flows through non-rotatable connection 128 and channel 120 to release pressure chamber 124.

For example, pressure chamber 136 is axially located between cover 102 and impeller shell 138 and is not included as part of the apply pressure chamber or the release pressure chamber. For the torque converter mode, pressurized fluid PF7 in chamber 136 is arranged to displace secondary hub 118 in axial direction AD2. Since torque converter 100 is in the torque converter mode, fluid pressure in channel C3 in shaft IS (which urges hub 118 in direction AD1) is lower than fluid pressure in chamber 136, and fluid PF7 displace hub 118 in direction AD2 until hub 118 contacts segment 116A of portion 116, and segment 118A of portion 118 blocks flow from channel C3 to channel 122. O-ring 160B is configured to enable a limited amount of fluid flow past O-ring 160B. Therefore, at the same time, pressurized fluid PF8 flows past O-ring 160B and through connection 128 into chamber 124 via channel 120 to increase fluid pressure in chamber 124.

In the example embodiment of FIGS. 6 and 7, hub 118 includes channel 142 and hub 110 includes channel 143. For the lockup mode, fluid pressure in torque converter 100 displaces secondary hub 118 in axial direction AD1 such that pressurized fluid PF9 flows past the secondary hub into apply pressure chamber 126 via channel 122, and pressurized fluid PF10 flows out of release apply chamber 124 through channels 120, 142 and 143 to channel C4 in shaft IS. Channel C4 is connected to a sump and is typically at atmospheric pressure. In lockup mode, fluid PF9 is at a higher pressure than fluid PF7, causing fluid PF9 to displace hub 118 in direction AD1.

In the example embodiment of FIGS. 6 and 7: assembly 112 includes dynamic seals 144A and 144B sealing hub 118 with respect to output hub 110 and enabling relative rotation between hub 118 and portion 116; and, O-rings 146A and 146B arranged to seal hub 118 against shaft IS and separate channels C3 and C4 and separate channels C3 and 142 from fluid PF3.

In the example embodiment of FIGS. 6 and 7, torque converter 100 includes: plate 146 non-rotatably connected to portion 116 and bounding chamber 126; and torsional vibration damper 148 including input part 150, output part 152 non-rotatably connected to turbine shell 154, and at least one spring 156 engaged with parts 152 and 154. In the lockup mode, piston 114 clamps part 150 to cover 102 to transmit torque from cover 102 to shell 154 via springs 156 and part 152.

Advantageously, seal system 112 uses the four fluid circuits in torque converter 100 to reinforce the operation of release chamber 124 and apply chamber 126 during torque converter and lockup mode and address the problems noted above associated with four pass torque converters. For example, supplying pressurized fluid to release chamber 124 while simultaneously draining fluid from apply chamber 126 ensures that sufficient force is applied to piston 114 to enable a desired lift-off of the piston, overcoming the drag force of seals used to isolate the release and apply chambers.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A torque converter, comprising:
a cover arranged to receive torque from an engine;
an impeller;
a turbine;
an output hub arranged to non-rotatably connect to an input shaft for a transmission;
a lockup clutch:
including an axially displaceable piston plate; and,
arranged to directly connect the cover to the output hub; and,
a seal system including:
a pilot portion including first and second channels; and,
a secondary hub overlapping the output hub in a radial direction, the secondary hub:
non-rotatably connected to the output hub and axially displaceable with respect to the output hub to control flow of pressurized fluid through the first and second channels; or,
non-rotatably connected to the pilot portion and axially displaceable with respect to the pilot portion to control flow of pressurized fluid through the first and second channels.

2. The torque converter of claim 1, further comprising:
a release pressure chamber partially bounded by the piston plate;
an apply pressure chamber partially bounded by the piston plate;
for a torque converter mode, fluid pressure in the release pressure chamber is arranged to displace the piston plate in a first axial direction to open the lockup clutch and enable independent rotation of the output hub with respect to the cover;
for a lockup mode, fluid pressure in the apply pressure chamber is arranged to displace the piston plate in a second axial direction, opposite the first axial direction, to close the lockup clutch and non-rotatably connect the cover and the output hub; and,
the first and second channels open to the release pressure chamber and the apply pressure chamber, respectively.

3. The torque converter of claim 2, wherein:
for the torque converter mode a first pressurized fluid in the torque converter, outside of the release and apply pressure chambers, is arranged to displace the secondary hub in the second axial direction such that:
the secondary hub blocks fluid flow through the second channel; and,
the first pressurized fluid flows through the first channel to the release pressure chamber.

4. The torque converter of claim 3, wherein:
the output hub and the secondary hub are non-rotatably connected by respective portions of the output hub and the secondary hub; and,
for the torque converter mode, the first pressurized fluid is arranged to flow:
between the respective portions of the output hub and the secondary hub;
through the first channel; and,
to the release pressure chamber.

5. The torque converter of claim 4, further comprising:
a torus enclosed by the impeller and the turbine, wherein:
the second channel is arranged to receive second pressurized fluid from a third channel partially formed by the input shaft; and,
for the torque converter mode:
the first pressurized fluid is arranged to flow:
from the torus; and,
between the respective portions of the output hub and the secondary hub;
the first pressurized fluid flowing between the respective portions of the output hub and the secondary hub is arranged to displace the secondary hub in the second axial direction; and,
the first pressurized fluid flowing between the respective portions of the output hub and the secondary hub is at arranged to be a higher pressure than the second pressurized fluid.

6. The torque converter of claim 5, wherein:
the secondary hub includes a fourth channel; and,
for the lockup mode:
the first pressurized fluid flowing between the respective portions of the output hub and the secondary hub is arranged to be a lower pressure than the second pressurized fluid;
the second pressurized fluid is arranged to displace the secondary hub in the first axial direction such that:
the second pressurized fluid is able to flow through the second channel to the apply pressure chamber; and,
the fourth channel aligns with the first channel to enable flow from the release pressure chamber to a fifth channel formed in the input shaft.

7. The torque converter of claim 3, wherein:
the pilot portion and the secondary hub are non-rotatably connected by respective portions of the pilot portion and the secondary hub; and,
for the torque converter mode, the first pressurized fluid is arranged to flow:
between the respective portions of the pilot portion and the secondary hub;
through the first channel; and,
to the release pressure chamber.

8. The torque converter of claim 7, further comprising:
a first chamber partially enclosed by the piston plate and the turbine, wherein:

the second channel is arranged to receive second pressurized fluid from a third channel partially formed by the input shaft; and,
for the torque converter mode:
the first pressurized fluid is arranged to flow:
from the first chamber; and,
between the respective portions of the pilot portion and the secondary hub;
the first pressurized fluid flowing between the respective portions of the pilot portion and the secondary hub is arranged to displace the secondary hub in the second axial direction; and,
the first pressurized fluid flowing between the respective portions of the pilot portion and the secondary hub is arranged to be at a higher pressure than the second pressurized fluid.

9. The torque converter of claim 8, wherein:
the secondary hub includes a fourth channel;
the output hub includes a fifth channel;
for the lockup mode:
the first pressurized fluid flowing between the respective portions of the pilot portion and the secondary hub is arranged to be a lower pressure than the second pressurized fluid; and,
the second pressurized fluid is arranged to displace the secondary hub in the first axial direction such that:
the second pressurized fluid is able to flow through the second channel to the apply pressure chamber; and,
the fourth and fifth channels align with the first channel to enable flow from the release pressure chamber to a sixth channel formed in the input shaft.

10. The torque converter of claim 2, further comprising:
a torus enclosed by the impeller and the turbine, wherein:
the torus is arranged to receive first pressurized fluid from a first pressurized fluid circuit;
the torus is arranged to flow second pressurized fluid out of the torus through a second pressurized fluid circuit, separate from the first pressurized fluid circuit;
the second channel is arranged to receive third pressurized fluid from a third pressurized fluid circuit, separate from the first and second pressurized fluid circuits; and,
the first channel is arranged to drain to a fourth pressurized fluid circuit:
separate from the first, second, and third circuits; and,
at atmospheric pressure.

11. The torque converter of claim 1, wherein:
the secondary hub is rotatable with respect to the pilot portion;
the secondary hub includes a third channel;
the sealing assembly includes:
a first dynamic seal:
in contact with the pilot portion and the secondary hub; and,
sealing the pilot portion against the secondary hub; and,
a second dynamic seal:
in contact with the pilot portion and the output hub; and,
sealing the pilot portion against the output hub; and,
the third channel opens between the first and second dynamic seals.

12. The torque converter of claim 1, wherein:
the secondary hub is rotatable with respect to the output hub;
the output hub includes a third channel; and,
the sealing assembly includes first and second dynamic seals:
in contact with the secondary hub and the output hub; and,
sealing the secondary hub against the output hub; and,
the third channel opens between the first and second dynamic seals.

13. A torque converter, comprising:
a cover arranged to receive torque from an engine;
an impeller;
a turbine;
an output hub arranged to non-rotatably connect to an input shaft for a transmission;
a lockup clutch:
including an axially displaceable piston plate; and,
arranged to directly connect the cover to the output hub;
a release pressure chamber partially bounded by the piston plate;
an apply pressure chamber partially bounded by the piston plate; and,
a seal system including:
a pilot portion including first and second channels; and,
a secondary hub non-rotatably connected to the output hub and axially displaceable with respect to the output hub to control flow of pressurized fluid through the first and second channels, wherein:
for a torque converter mode, fluid pressure in the release pressure chamber is arranged to displace the piston plate in a first axial direction to open the lockup clutch and enable independent rotation of the output hub with respect to the cover;
for a lockup mode, fluid pressure in the apply pressure chamber is arranged to displace the piston plate in a second axial direction, opposite the first axial direction, to close the lockup clutch and non-rotatably connect the cover and the output hub; and,
the first and second channels open to the release pressure chamber and the apply pressure chamber, respectively.

14. The torque converter of claim 13, wherein:
for the torque converter mode a first pressurized fluid in the torque converter, outside of the release and apply pressure chambers, is arranged to displace the secondary hub in the second axial direction such that:
the secondary hub blocks fluid flow through the second channel; and,
the first pressurized fluid flows through the first channel to the release pressure chamber.

15. The torque converter of claim 14, wherein for the torque converter mode, the first pressurized fluid is arranged to flow: between respective portions of the output hub and the secondary hub; through the first channel; and to the release pressure chamber.

16. The torque converter of claim 15, further comprising:
a torus enclosed by the impeller and the turbine, wherein:
the second channel is arranged to receive second pressurized fluid from a third channel partially formed by the input shaft; and,
for the torque converter mode:
the first pressurized fluid is arranged to flow:
from the torus; and,
between the respective portions of the output hub and the secondary hub;

the first pressurized fluid flowing between the respective portions of the output hub and the secondary hub is arranged to displace the secondary hub in the second axial direction; and, the first pressurized fluid flowing between the respective portions of the output hub and the secondary hub is at arranged to be a higher pressure than the second pressurized fluid.

17. A torque converter, comprising:
a cover arranged to receive torque from an engine;
an impeller;
a turbine;
an output hub arranged to non-rotatably connect to an input shaft for a transmission, the output hub including a first channel;
a lockup clutch:
   including an axially displaceable piston plate; and,
   arranged to directly connect the cover to the output hub;
a release pressure chamber partially bounded by the piston plate;
an apply pressure chamber partially bounded by the piston plate; and,
a seal system including:
   a pilot portion including second and third channels; and,
   a secondary hub non-rotatably connected to the pilot portion and axially displaceable with respect to the pilot portion to control flow of pressurized fluid through the first and second channels, wherein:
the first channel is radially inward of the second and third channels;
for a torque converter mode, fluid pressure in the release pressure chamber is arranged to displace the piston plate in a first axial direction to open the lockup clutch and enable independent rotation of the output hub with respect to the cover;
for a lockup mode, fluid pressure in the apply pressure chamber is arranged to displace the piston plate in a second axial direction, opposite the first axial direction, to close the lockup clutch and non-rotatably connect the cover and the output hub; and,
the first and second channels open to the release pressure chamber and the apply pressure chamber, respectively.

18. The torque converter of claim 17, wherein:
for the torque converter mode, a first pressurized fluid in the torque converter, outside of the release and apply pressure chambers, is arranged to displace the secondary hub in the second axial direction such that:
   the secondary hub blocks fluid flow through the second channel; and,
   the first pressurized fluid flows through the first channel to the release pressure chamber.

19. The torque converter of claim 18, wherein for the torque converter mode, the first pressurized fluid is arranged to flow:
between respective portions of the pilot portion and the secondary hub;
through the first channel; and,
to the release pressure chamber.

20. The torque converter of claim 19, further comprising:
a first chamber partially enclosed by the piston plate and the turbine, wherein:
the second channel is arranged to receive second pressurized fluid from a third channel partially formed by the input shaft; and,
for the torque converter mode:
   the first pressurized fluid is arranged to flow:
      from the first chamber; and,
      between the respective portions of the pilot portion and the secondary hub;
   the first pressurized fluid flowing between the respective portions of the pilot portion and the secondary hub is arranged to displace the secondary hub in the second axial direction; and,
   the first pressurized fluid flowing between the respective portions of the pilot portion and the secondary hub is arranged to be at a higher pressure than the second pressurized fluid.

* * * * *